United States Patent
Rompa

[11] 3,785,461
[45] Jan. 15, 1974

[54] AIR LINE OILERS

[76] Inventor: Jozef Johannes Theresia Rompa, 14, Bredaseweg, Terheyden, Netherlands

[22] Filed: Dec. 27, 1971

[21] Appl. No.: 211,995

[30] Foreign Application Priority Data
Jan. 18, 1971 Netherlands.................. 7100621

[52] U.S. Cl.................. 184/55 A, 184/64, 239/326
[51] Int. Cl.............................................. F16n 7/34
[58] Field of Search.................. 261/63, 99, 107, 261/78 A; 184/55 R, 55 A, 64; 239/326

[56] References Cited
UNITED STATES PATENTS

| | | | |
|---|---|---|---|
| 2,456,270 | 12/1948 | Giwosky et al. | 184/55 A |
| 2,155,850 | 4/1939 | Vogel | 239/326 |
| 2,512,366 | 6/1950 | Nast | 184/55 A |
| 2,229,176 | 1/1941 | Kehle | 184/55 A |
| 2,705,622 | 4/1955 | Laub | 261/78 A X |
| 2,735,512 | 2/1956 | Faust | 184/55 A |
| 3,131,786 | 5/1964 | Gleason et al. | 184/55 A |
| 2,978,170 | 4/1961 | Ivie | 184/64 X |

Primary Examiner—Manuel A. Antonakas
Attorney—Alan H. Levine

[57] ABSTRACT

Air line oiler comprising an oil chamber into which a capillary member extends which is exposed to the air flow of the line to be oiled, the inlet of the downstream part of said air line being closed by said capillary member.

4 Claims, 1 Drawing Figure

PATENTED JAN 15 1974  3,785,461
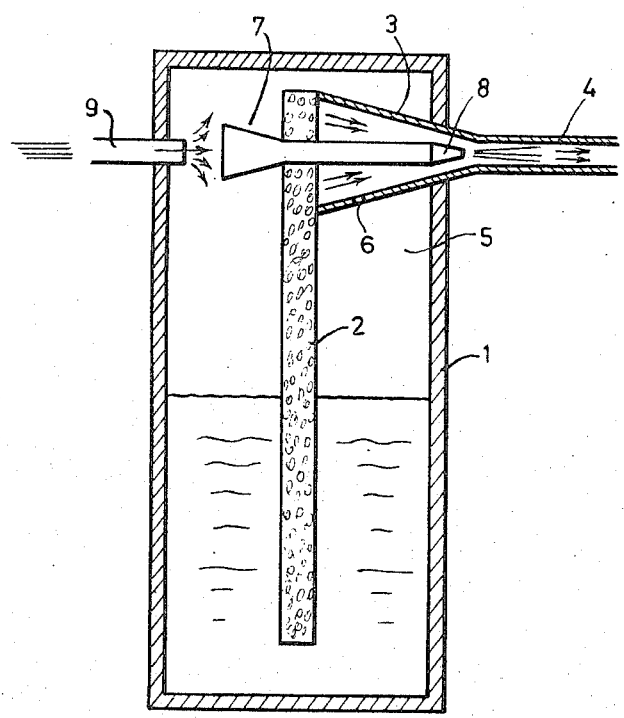
INVENTOR:
JOZEF J. T. ROMPA
BY
Alan H. Levine
ATTORNEY

AIR LINE OILERS

BACKGROUND OF THE INVENTION

This invention relates to an air line oiler comprising an oil chamber into which a capillary member extends which is exposed to the air flow of the line to be oiled.

In known oilers of this type, the capillary member extends to a limited extent into the air line to be oiled, so that part of the air flow strikes against said capillary member for taking up some oil which is used for preventing dry running of the pneumatic devices operated by the air flow. A disadvantage of known oilers of this type is that the amount of oil taken along with the air flow cannot be accurately controlled although this amount is critical for a proper operation of the pneumatic devices.

My invention provides a solution for this problem in that an air line oiler comprising an oil chamber into which a capillary member extends which is exposed to the air flow of the line to be oiled, is characterised in that the inlet of the downstream part of said air line is closed by said capillary member.

This produces a strong pressure differential across the capillary member which has the advantage that the influence of oil level differences in the oil chamber and pressure fluctuations in the air line is minimized so that the amount of oil taken along by the air is mainly governed by easily controllable variables such as the capillary properties of the capillary member and the amount of air passed through the capillary member.

According to a further feature of my invention, a control of the amount of air passed through the capillary member is obtained in that a nozzle traverses the capillary member concentrically with the inlet of the downstream part of the air line, whereas the upstream part of the air line ends short of the inlet of said nozzle. By varying the spacing between the outlet of the upstream part of the air line and the inlet of the nozzle, the ratio between the air flows through the nozzle and through the surrounding capillary member can be changed to suit conditions.

SURVEY OF THE DRAWINGS

The accompanying drawing is a schematic section of an air line oiler according to the invention.

DESCRIPTION OF A PREFERRED EMBODIMENT:

A bar strip 2 of a material having capillary properties such as sintered bronze is arranged in a closed vessel 1 against the funnel shaped inlet 3 of an air line 4 such that there is no leakage between the inlet 3 and the strip 2. However, a small bleed bore 6 may be provided at the bottom of the inlet 3. The vessel 1 is partly filled with oil and the capillary strip 2 is partly immersed in the oil so that the oil rises in the strip 2 by capillary action. A venturi type nozzle 7, 8 traverses the strip 2 concentrically with the inlet 3 such that the outlet 8 of the nozzle is near the small end of the inlet 3. An air inlet line 9 is passed through the wall of the vessel 1 such that its spacing to the widened inlet 7 of the nozzle can be adjusted.

The air line 4 is connected to a pneumatic device which should receive air containing a small amount of oil. This oil is taken up in the air passing the strip 2 because of the pressure differential existing between the upstream side (left) of the strip 2 and the downstream side thereof in the inlet 3. This pressure differential may be caused by suction exerted in the line 4, but generally the inlet line 9 is connected to a pressure source for operating the pneumatic device, so that the pressure differential is caused by the pressure drop in the air flow across the capillary strip 2.

In operation, the air flow through the inlet line 9 fills the space in the vessel 1 and since the inlet line 9 and the outlet line 4 pass sealingly through the walls of the vessel 1, all air must either flow through the nozzle 7, 8 or through the pores of the capillary strip 2 towards the outlet line 4. The ratio between the amounts of air flowing through the nozzle 7, 8 and through the pores of the capillary strip 2 can be adjusted by moving the outlet of the line 9 towards the inlet of the nozzle or away from said inlet. In this way, the amount of oil added to the air is adjusted.

If the air flow is intermittent, it is sometimes possible to dispense with the nozzle 7, 8 since the air flow through the capillary strip 2 suppresses the capillary action so that a pulsating air flow only takes along the oil which has risen in the capillary strip during the intervals between air flow periods and thus, excessive oiling is prevented. If the air flow is continuous, however, only part of the air should pass through the capillary strip 2 and the remainder of the air should pass through the nozzle 7, 8 at a ratio determined by the spacing between line 9 and nozzle 7.

The capillary strip 2 may be made of sintered bronze, but it can also be fabric sheet or the like.

The oiler according to the invention ensures a regular addition of very small amounts of oil to the air, whereas no special type of oil is necessary and the capillary strip 2 acts also as a filter so that a separate filter is superfluous. Moreover, no needle valve or the like for regulating the added amount of oil is necessary.

What I claim is:

1. An air line oiler for use with an air line having an upstream portion and a downstream portion, said oiler comprising:
    an oil chamber, the ends of the air line portions being arranged within said chamber and spaced apart from each other,
    a capillary member within said chamber, said member completely covering the inlet end of the downstream portion of the air line, so that all the air entering said chamber through the upstream portion of said air line will flow across said capillary member into the downstream portion of the air line, and
    a nozzle extending through said capillary member, one end of said nozzle being open to said chamber interior and the other end being arranged within the downstream portion of the air line, said one end of said nozzle being spaced from the end of the upstream portion of the air line located within said chamber, so that a portion of the air entering the downstream portion of the air line flows through said capillary member and the remainder of the air flows through said nozzle.

2. An air line oiler as defined in claim 1 wherein the spacing between said one end of said nozzle and the end of the upstream portion of the air line within said chamber is adjustable to vary the proportion between the amount of air flowing through said nozzle and the amount of air flowing through said capillary member.

3. An air line oiler as defined in claim 1 wherein the inlet end of the downstream portion of the air line is funnel shaped.

4. An air line oiler as defined in claim 1 including a bleed opening in the downstream portion of the air line establishing communication between the interior of said downstream portion and the interior of said chamber.

* * * * *